United States Patent
Gomyo et al.

(10) Patent No.: US 7,118,278 B2
(45) Date of Patent: Oct. 10, 2006

(54) HYDRODYNAMIC BEARING, MANUFACTURING METHOD OF HYDRODYNAMIC BEARING, SPINDLE MOTOR PROVIDED WITH HYDRODYNAMIC BEARING AND DISK DRIVE DEVICE PROVIDED WITH THIS SPINDLE MOTOR

(75) Inventors: Masato Gomyo, Kyoto (JP); Noboru Ashibe, Kyoto (JP); Junya Mizukami, Kyoto (JP)

(73) Assignee: Nidec Corporation, Kyoto (JP)

( * ) Notice: Subject to any disclaimer, the term of this patent is extended or adjusted under 35 U.S.C. 154(b) by 210 days.

(21) Appl. No.: 10/709,986

(22) Filed: Jun. 11, 2004

(65) Prior Publication Data
US 2005/0058374 A1    Mar. 17, 2005

(30) Foreign Application Priority Data
Jun. 12, 2003 (JP) .............................. 2003-167905

(51) Int. Cl.
*F16C 32/06* (2006.01)
*F16C 33/74* (2006.01)

(52) U.S. Cl. ...................................... 384/119; 384/132

(58) Field of Classification Search ................ 384/100, 384/107, 119, 124, 132; 360/99.08, 98.07; 310/90
See application file for complete search history.

(56) References Cited

U.S. PATENT DOCUMENTS

| | | | |
|---|---|---|---|
| 5,423,612 A | 6/1995 | Zang et al. | |
| 5,876,124 A | 3/1999 | Zang et al. | |
| 6,339,270 B1 * | 1/2002 | Ichiyama | 310/90 |
| 6,781,268 B1 * | 8/2004 | Oku | 310/90 |
| 6,836,388 B1 * | 12/2004 | Nishimura et al. | 360/99.08 |
| 2003/0091250 A1 | 5/2003 | Gomyo | |
| 2003/0133634 A1 * | 7/2003 | Le et al. | 384/132 |

FOREIGN PATENT DOCUMENTS

| | | |
|---|---|---|
| JP | 2001-065552 A | 3/2001 |
| JP | 2001-082458 A | 3/2001 |
| JP | 2001-090733 A | 4/2001 |
| JP | 2002-168250 A | 6/2002 |
| JP | 2002-250341 A | 9/2002 |
| JP | 2003-148457 A | 5/2003 |
| JP | 2003-161322 A | 6/2003 |

* cited by examiner

*Primary Examiner*—Thomas R. Hannon
(74) *Attorney, Agent, or Firm*—Judge & Murakami IP

(57) ABSTRACT

A suitable the inner point is set on a vapor-liquid face of lubricating fluid formed in a composite capillary seal section that utilizes capillary force and rotational centrifugal force acted on the lubricating fluid. An inner peripheral surface of a ring-shaped portion is formed such that the minimum value R1 in radial-direction distances of the inner peripheral face of the ring-shaped portion becomes greater than a radial-direction distance R2 of the inner point (R1>R2). This can observe the inner point of the lubricating fluid from the immediately-above position, whereby the filling amount of the lubricating fluid can easily and surely be measured, thereby being capable of adjusting the filling amount of the lubricating fluid to a preset amount.

15 Claims, 13 Drawing Sheets

HYDRODYNAMIC BEARING, MANUFACTURING METHOD OF HYDRODYNAMIC BEARING, SPINDLE MOTOR PROVIDED WITH HYDRODYNAMIC BEARING AND DISK DRIVE DEVICE PROVIDED WITH THIS SPINDLE MOTOR

BACKGROUND OF INVENTION

1. Field of the Invention

The present invention relates to a hydrodynamic bearing having a composite capillary seal section for preventing lubricating fluid retained in the hydrodynamic bearing from leaking to the outside of the bearing by utilizing both the capillary force and rotational centrifugal force.

2. Background Art

In a hard disk drive device or removable disk drive device, a hydrodynamic bearing has conventionally been used as a bearing of a motor for driving a recording disk, that generates dynamic pressure by lubricating fluid (for example, oil) retained in a bearing gap between a shaft and a sleeve when the motor rotates. Various types of a hydrodynamic bearing have been proposed.

This hydrodynamic bearing is required to reduce as much as possible the leakage of the oil, retained in the bearing gap, to the outside to thereby ensure the lifetime of the oil and to maintain the characteristic of the hydrodynamic bearing in a stable manner over a long period. In the hydrodynamic bearing using oil as working fluid as described above, a tapered seal gap (hereinafter referred to as a capillary seal section) is formed at the edge section of the hydrodynamic bearing, wherein oil is retained in the capillary seal section while forming a vapor-liquid surface between the oil and air in the capillary seal section.

In the capillary seal section in the hydrodynamic bearing, the size of the gap in the radial direction formed in the capillary seal section is gradually expanded as the capillary seal section is away from the hydrodynamic bearing, whereby a difference occurs in the capillary force of the oil depending upon the position where the vapor-liquid face of the oil retained in the gap in the radial direction is formed. Therefore, the capillary seal section has a function of supplying oil therefrom, in case where the amount of oil retained in the hydrodynamic bearing decreases, and a function of accommodating the increasing amount in case where the volume of the oil retained in the hydrodynamic bearing increases due to the temperature rise of the oil or the like.

A composite capillary seal section has recently been proposed, as a motor having a rotor that rotates at extremely high speed, that utilizes "capillary force" of the oil and "rotational centrifugal force acted when the motor rotates" to thereby firmly prevent the oil from flowing to the outside of the hydrodynamic bearing.

The composite capillary seal section of this type is formed in a gap in the radial direction between an inclined face 1a of a rotor 1 and an inclined face 2a of a stationary member 2, as shown in FIG. 13. The size of the gap in the radial direction between the inclined faces 1a and 2a of the rotor 1 and the stationary member 2 is gradually expanded toward an opening side (the downward side in the figure) of the composite capillary seal section 3, whereby oil 4 is retained in the composite capillary seal section 3. Further, a center axis line M of the radial-direction gap in the composite capillary seal section 3 is inclined toward the direction in which it gradually approaches the rotation axis line X, whereby upon the rotation of the rotor 1, the composite capillary seal section 3 pumps the oil 4 toward the hydrodynamic bearing (the upward side in the figure) by the rotational centrifugal force.

In the hydrodynamic bearing having the composite capillary seal section 3, the more the inclination angle of the central axis line M of the radial-direction gap in the composite capillary seal section 3 increases with respect to the rotation axis X, the more the rotational centrifugal force that pumps the oil 4 toward the hydrodynamic bearing can be increased upon the rotation of the rotor 1. Moreover, in the hydrodynamic bearing provided with the composite capillary seal section 3, the sealing function can be enhanced as the size of the radial-direction gap in the capillary seal section 3 is reduced as much as possible and the vapor-liquid face of the oil 4 is positioned in more proximate to the hydrodynamic bearing.

In this case, however, the vapor-liquid face 4a of the oil 4 retained in the composite capillary seal section 3 is shifted toward the hydrodynamic bearing, so that it is difficult to observe the vapor-liquid face 4a, i.e., the management of the filling amount of the oil 4 since the inclined face 1a of the rotor 1 interferes. As a result, in case where the filling amount of the oil 4 in the hydrodynamic bearing is small, the oil 4 may be exhausted, or in case where the filling amount is too much, the oil 4 may flow to the outside of the composite capillary seal section 3, thereby being difficult to ensure the lifetime of the hydrodynamic bearing and arising a fear of deteriorating reliability of the hydrodynamic bearing.

SUMMARY OF INVENTION

An object of the present invention is to provide a hydrodynamic bearing that can easily observe a vapor-liquid surface of oil in a composite capillary seal section, and its manufacturing method.

Another object of the present invention is to provide a hydrodynamic bearing provided with a composite capillary seal section that can easily manage the filling amount of oil in the hydrodynamic bearing, and its manufacturing method.

Still another object of the present invention is to provide a hydrodynamic bearing provided with a composite capillary seal section that prevents early exhaustion of oil, prevents the leakage of oil toward the outside of the hydrodynamic bearing and can retain oil over a long period in a stable manner, and its manufacturing method.

Still another object of the present invention is to provide a spindle motor provided with a hydrodynamic bearing with excellent reliability and a disk drive device provided with this spindle motor.

In order to achieve the above-mentioned subjects, one example of the present invention provides a hydrodynamic bearing comprising a top plate fixed to the upper section of a shaft, the top plate having an ring-shaped portion extended in a lower direction, a bottom plate fixed to the lower section of a sleeve that rotates relative to the shaft about a rotation axis, and a bearing section having a dynamic pressure generating groove, formed in a minute gap between the upper end face of the sleeve and the lower end face of the top plate, that induces dynamic pressure in lubricating fluid retained in the minute gap upon a rotation of a motor.

Further, the hydrodynamic bearing has a capillary seal section that is provided adjacent to the bearing section to extend from the bearing section toward the bottom plate wherein its gap in the radial direction at least increases toward a rotation axis, wherein a vapor-liquid face of the lubricating fluid is formed in the capillary seal section.

the minimum value of radial-direction distances between the inner peripheral face of the ring-shaped portion and the rotation axis is set as R1, and a radial-direction distance from an inner point on a boundary between the vapor-liquid face of the lubricating fluid and the outer peripheral face of the sleeve is set as R2, the relationship of R1>R2 is established.

According to this, the inner point on the boundary can easily and satisfactorily be observed from the position immediately above the capillary seal section without being interfered with the inner peripheral face of the ring-shaped portion.

The position in the radial direction and the height position in the axial direction in the inner point on the boundary is measured by the observation of the inner point on the boundary, and the measured inner point is adjusted to the position that is set in advance, thereby being capable of adjusting the filling amount of the lubricating fluid. Accordingly, the lubricating fluid in the hydrodynamic bearing provided with the capillary seal section can be ensured over a long period, thereby being capable of remarkably enhancing reliability of the hydrodynamic bearing.

DETAILED DESCRIPTION

One embodiment of a hydrodynamic bearing, a manufacturing method of this hydrodynamic bearing, a spindle motor using this hydrodynamic bearing and a disk drive device provided with this spindle motor will be explained herein below with reference to FIGS. 1 to 12. The vertical direction in each figure is referred to as "vertical direction" for the sake of convenience in the explanation about one embodiment of the present invention, but this phrase does not limit the direction in the actual mounting state.

Figure 1:
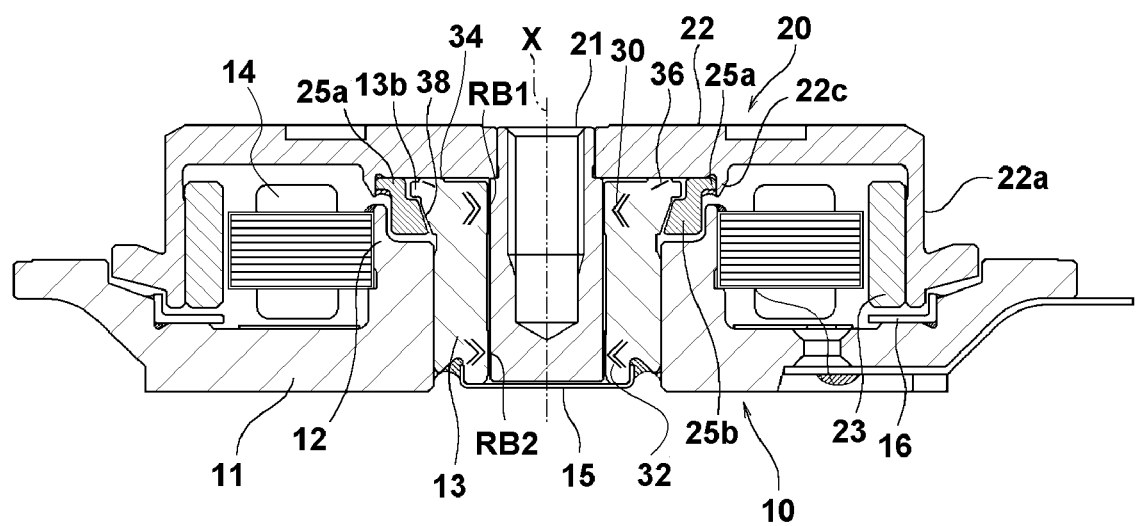
FIG. 1 is a longitudinal sectional view showing a spindle motor provided with a hydrodynamic bearing according to one embodiment of the present invention.

As shown in FIG. 1, a spindle motor of a first embodiment has a stationary assembly 10 and a rotor assembly 20 mounted to the stationary assembly 10 from the upper side in the figure.

Figure 12:
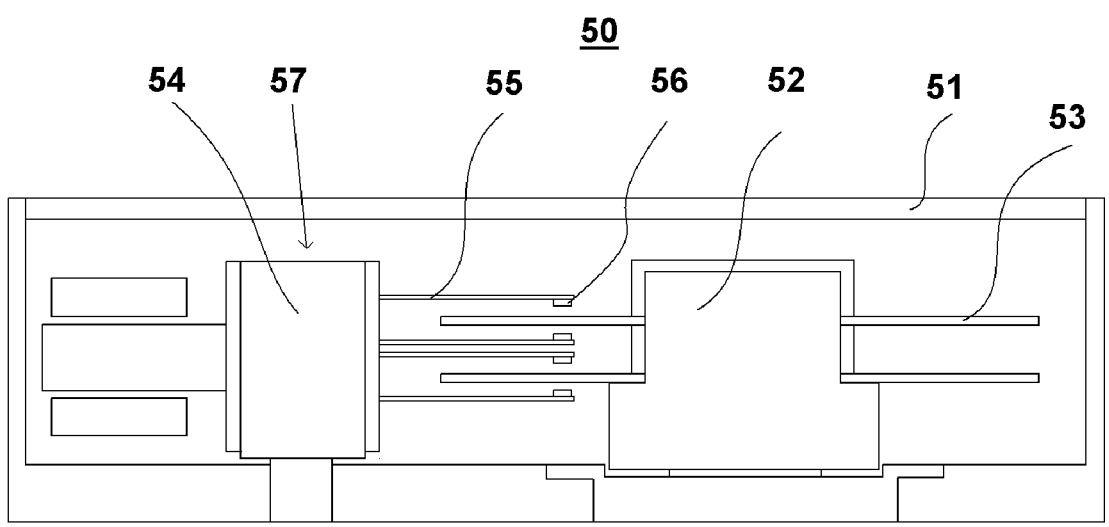
FIG. 12 is a typical view showing a schematic construction of a disk drive device provided with the spindle motor shown in FIGS. 1, 10 and 11.
Figure 13:
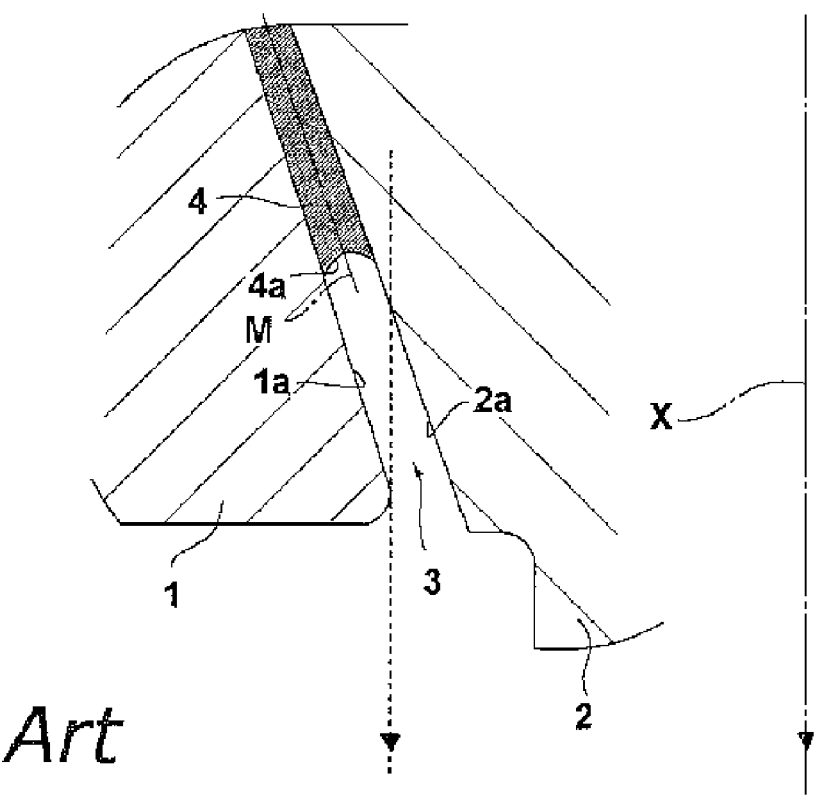
FIG. 13 is an enlarged longitudinal sectional view showing an opening section of a conventional composite capillary seal section.

The stationary assembly 10 has a base plate 11 that is fixed to a housing 51 of a hard disk drive device (numeral 50 in FIG. 12). A stator 14 is fixed at the outer peripheral face of a cylindrical section 12 formed at an approximately central section of this base plate 11. A sleeve 13 is fixed to the inner peripheral face of the cylindrical section 12 by means such as a press-fitting or the like. The sleeve 13 is a hollow cylindrical member formed of a copper based material such as phosphor bronze for facilitating its processing. The lower end section of the sleeve 13 is closed by a seal member 15 and a shaft 21 is inserted into its inner peripheral face so as to make a gap between the shaft 21 and the sleeve 13. The upper end face of the sleeve 13 opposes to the rotor assembly 20 via a gap. It should be noted that the shaft 21 is formed of a stainless steel in this embodiment.

The rotor assembly 20 has the shaft 21 and an approximately cup-like rotor hub 22 that is fixed above the shaft 21 in the axial direction. A peripheral wall 22a extending downward in the axial direction from the outer peripheral section of the rotor hub 22 is formed at the outer peripheral section of the rotor hub 22. A hard disk (numeral 53 in FIG. 12) is fixedly held at the outer peripheral section of the peripheral wall 22a and a rotor magnet 23 that opposes to the stator 14 via a gap in the radial direction is held by means such as an adhesion or the like at the inner peripheral surface of the peripheral wall 22a.

In the above-mentioned construction, the gap between the bottom surface of the rotor hub 10 and the upper end surface of the sleeve 13, the gap between the inner peripheral face of the sleeve 13 and the outer peripheral face of the shaft 21 and the gap between the lower end face of the shaft 12 and the upper end face of the seal member 15 continue to one another. Oil serving as lubricating fluid is retained in this continuous gap without a break. Examples of oil include ester-based one or poly-α-olefin-based one.

Subsequently, the construction of the hydrodynamic bearing will be explained. An upper radial dynamic pressure bearing RB1 and a lower radial dynamic pressure bearing RB2 are provided so as to be apart from each other in the axial direction in the gap in the radial direction between the inner peripheral face of the sleeve 13 and the outer peripheral face of the shaft 21. The upper radial dynamic pressure bearing RB1 and the lower radial dynamic pressure bearing RB2 is composed of the inner peripheral face of the sleeve 13, the outer peripheral face of the shaft 21 and oil retained in the radial-direction opposing gap between the sleeve 13 and the shaft 21.

A herring bone groove 30 having a vertically symmetric shape is formed at the section on the inner peripheral face of the sleeve 13 composing the upper radial dynamic pressure bearing RB1 in order that oil is induced from both end sections in the axial direction of the upper radial dynamic pressure bearing RB1 to its approximately central section. When the rotor assembly 20 rotates, the oil has the maximum pressure at the approximately central section of the upper radial dynamic pressure bearing RB1 to thereby support the rotor assembly 20.

Further, a herring bone groove 32 having a vertically symmetric shape is formed at the section on the inner peripheral surface of the sleeve 13 composing the lower radial dynamic pressure bearing RB2 in order that oil is induced from both end sections in the axial direction of the lower radial dynamic pressure bearing RB2 to its approximately central section. When the rotor assembly 20 rotates, the oil has the maximum pressure at the approximately central section of the lower radial dynamic pressure bearing RB2 to thereby support the rotor assembly 20.

Moreover, a thrust dynamic pressure bearing 34 is formed in the gap in the axial direction between the upper end face of the sleeve 13 and the bottom face of the rotor hub 22. The thrust dynamic pressure bearing 34 is composed of the upper end face of the sleeve 13, the bottom face of the rotor hub 22 and oil retained in the axial-direction opposing gap between the sleeve 13 and the rotor hub 22. A spiral groove 36 is formed at the upper end face of the sleeve 13 in order that oil is induced in the inward of the radial direction (to the side of the upper outer peripheral face of the shaft 21) when the motor rotates.

Further, a ferromagnetic ring-shaped thrust yoke 16 is provided at the position on the base plate 11 opposite to the rotor magnet 23 in the axial direction. The thrust yoke 16 produces magnetic suction force in the axial direction with the rotor magnet 23, so that it balances the bearing power in the axial direction acted in the direction of floatation (the upward direction in FIG. 1) to thereby stabilize the support of the rotor assembly 20 in the axial direction and restrain the occurrence of over-floatation that means the rotor assembly 20 floats more than necessary.

Figure 2:
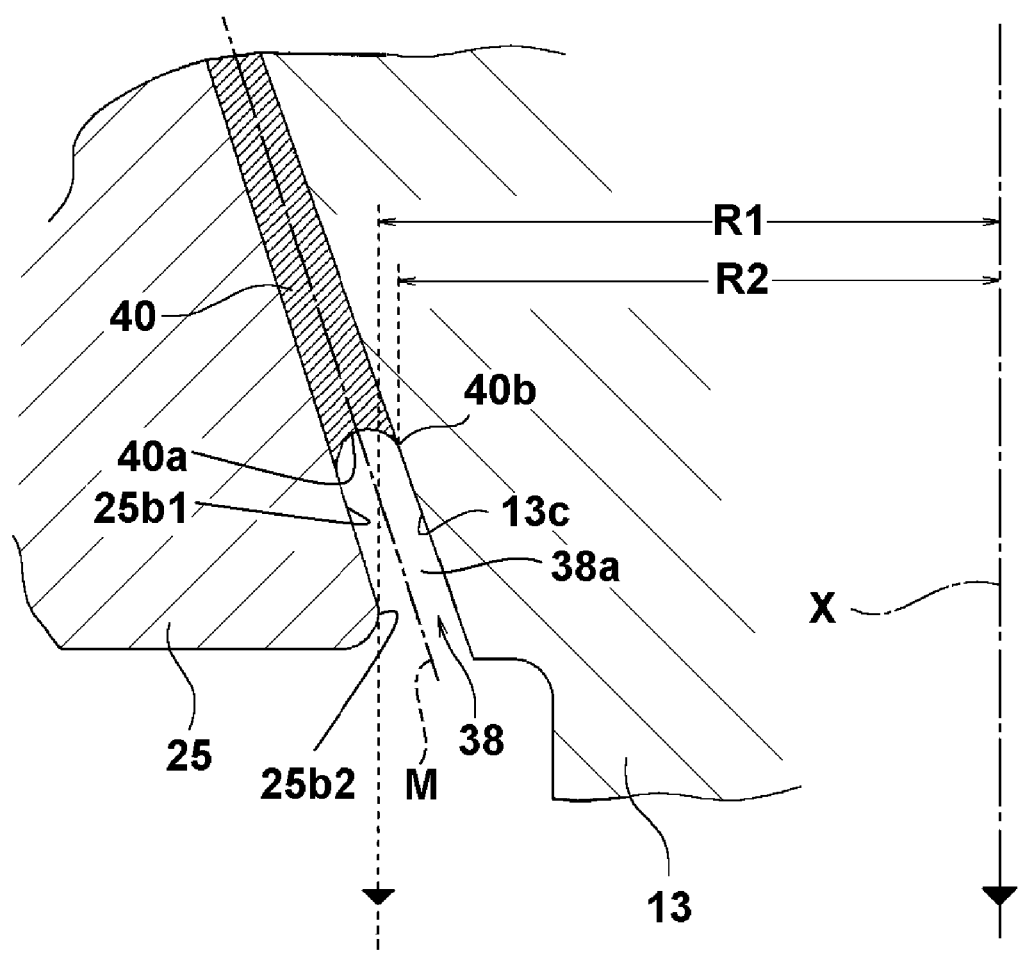
FIG. 2 is an enlarged longitudinal sectional view showing an opening section of a composite capillary seal section used for the spindle motor shown in FIG. 1.

A composite capillary seal section 38 utilizing both the capillary force and the rotational centrifugal force is formed at the upper outer peripheral side of the sleeve 13. As shown in FIG. 2, the composite capillary seal section 38 is provided outward from the thrust dynamic pressure bearing 34 in the radial direction. The composite capillary seal section 38 is composed of the outer peripheral inclined face 13c of the sleeve 13, the first inner peripheral face 25b1 of the ring-shaped portion 25 that opposes to the outer peripheral inclined face 13c in the radial direction, a radial-direction gap 38a between the outer peripheral inclined face 13c and the first inner peripheral face 25b1 and oil 40, described later in detail, retained in the radial-direction gap 38a.

The ring-shaped portion 25 is a member having an approximately ring-like shape formed of a stainless steel or the like. Mounted above the ring-shaped portion 25 is a plate-like mounting section 25a that is fixed by a fixing section 22c formed at the rotor hub 22. The fixing section 22c of the rotor hub 22 is disposed outward in the radial direction from the thrust dynamic pressure bearing 34 on the bottom face of the rotor hub 22, and projects downward in the axial direction from the bottom face of the rotor hub 22. The fixing section 22c is formed so as to cover the mounting section 25a of the ring-shaped portion 25 from the outside in the axial direction. The ring-shaped portion 25 is firmly fixed to the rotor hub 22 by doing a plastic deformation such as a caulking or the like on the leading end section of the fixing section 22c.

Further, as shown in FIG. 1, a flange section 13b projecting outward in the radial direction is formed at the upper outer peripheral face of the sleeve 13. The outer peripheral face of the flange section 13b opposes to the inner peripheral face of the mounting section 25a of the ring-shaped portion 25 in the radial direction via a gap, while the lower end face of the flange section 13b opposes to the upper end face of the body section 25b of the ring-shaped portion 25 in the radial direction via a gap. The arrangement of the flange section 13b above the body section 25b of the ring-shaped portion 25 in the axial direction allows to engage the upper end face of the body section 25b with the lower end face of the flange section 13b upon the rotation of the motor, thereby controlling the movement of the rotor assembly 20 with respect to the stationary assembly 10 in the axial direction.

Oil is continuously retained in the gap in which the thrust dynamic pressure bearing 34 is formed, the radial-direction gap between the flange section 13b of the sleeve 13 and the mounting section 25a of the ring-shaped portion 25 and the above-mentioned composite capillary seal section 38.

As shown in FIG. 2, the radial-direction gap 38a between the outer peripheral inclined face 13c of the sleeve 13 and the first inner peripheral face 25b1 of the ring-shaped portion 25, both composing the composite capillary seal section 38, is formed so as to be gradually expanded toward the downward in the axial direction, by which a tapered seal gap producing capillary force is formed. As described above, the oil 40 in the thrust dynamic pressure bearing 34 is continuously filled up to the composite capillary seal section 38, so that the internal pressure of the oil 40 and the atmospheric pressure are balanced to form a vapor-liquid surface 40a in the composite capillary seal section 38.

The outer peripheral inclined face 13c of the sleeve 13 and the first inner peripheral face 25b1 of the ring-shaped portion 25 that compose the composite capillary seal section 38 is formed into a tapered shape that is gradually inclined toward the downward in the axial direction to the inner side in the radial direction. Specifically, the center axis line M of the composite capillary seal section 38 gradually approaches the rotation axis X as it directs downward in the axial direction. By this construction, the rotational centrifugal force generating upon the rotation of the motor acts to pull the oil 40 in the composite capillary seal section 38 into the side of the thrust dynamic pressure bearing 34 (upward in the figure).

Here, the radial-direction distance from the rotation axis X of the shaft 21 to the leading end section 25b2 of the first inner peripheral face 25b1 of the ring-shaped portion 25 is set as R1. Further, a inner point 40b where the vapor-liquid face 40a of the oil 40 comes in contact with the outer peripheral inclined face 13c of the sleeve 13 is set as a inner point in this embodiment. The outer peripheral inclined face 13c of the sleeve 13 is formed to have a following construction in order to make it possible to detect and measure the position of the inner point 40b in the composite capillary seal section 38 with a microscope or the like.

Specifically, if the radial-direction distance from the rotation axis X to the inner point 40b is set as R2, the shape and the inclination angle of the first inner peripheral face 25b1 of the ring-shaped portion 25 are set such that the radial-direction distance R1 becomes longer than the radial-direction distance R2 (R1>R2).

In this case, the inclination angle of the outer peripheral inclined face 13c provided at the outer peripheral face of the sleeve 13 is set to a range within from about 20 degrees to about 35 degrees, preferably a range within from about 26 degrees to about 33 degrees, with respect to the rotation axis X. Further, the inclination angle of the first inner peripheral face 25b1 of the ring-shaped portion 25 is set to a range within from about 15 degrees to about 30 degrees, preferably a range within from about 20 degrees to about 27 degrees, with respect to the rotation axis X. The inclination angle of the composite capillary seal section 38 formed between the outer peripheral inclined face 13c and the first inner peripheral face 25b1 is set to a range within from about 2 degrees to about 15 degrees, preferably a range within from about 5 degrees to about 10 degrees, with respect to the rotation axis X.

Figure 3:
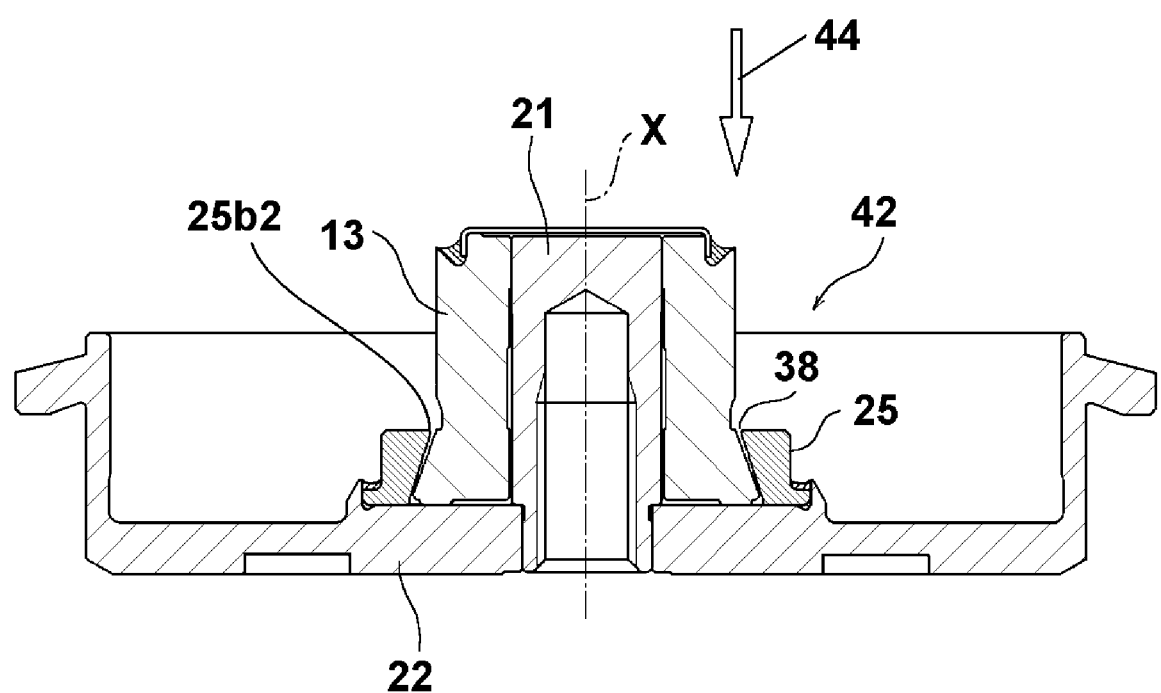
FIG. 3 is a longitudinal sectional view showing a state wherein a inner point measurement is performed to oil in the composite capillary seal section.

Subsequently explained is the inner point 40b of the vapor-liquid face 40a of the oil 40 in this embodiment. At first, a bearing assembly 42 is formed in which the sleeve 13 and the ring-shaped portion 25 are respectively mounted to the rotor hub 22 and the shaft 21 as shown in FIG. 3. Subsequently, oil is filled in the gap composing the upper and lower radial dynamic pressure bearings RB1 and RB2, the thrust dynamic pressure bearing 34 and the composite capillary seal section 38. Then, the bearing assembly 42 is set such that the leading end section 25b2 of the composite capillary seal section 38 is positioned upward in the axial direction. The vapor-liquid face 40a of the oil 40 retained in the composite capillary seal section 38 is observed from the position immediately above the composite capillary seal section 38 as shown by an arrow 44, to thereby measure the position of the inner point 40b of the vapor-liquid face 40a. Examples of a method for observing the vapor-liquid face 40a include a method for observing by irradiating laser beam, a method by visual observation, or a method by using a microscope or the like.

At this time, the inner point 40b can easily and satisfactorily be observed from the position immediately above the composite capillary seal section 38 without being interfered by the first inner peripheral face 25b1 of the ring-shaped portion 25. The radial-direction position of the vapor-liquid face 40a in the composite capillary seal section 38 is measured by the observation of the inner point 40b, whereby the radial-direction position of the vapor-liquid face 40a is adjusted to a preset position based upon this measurement. This can adjust a total filling amount of the oil 40 upon assembling the motor. Therefore, the oil 40 in the hydrodynamic bearing provided with the composite capillary seal section 38 can be ensured over a long period, thereby being capable of remarkably enhancing reliability of the hydrodynamic bearing.

Figure 4:
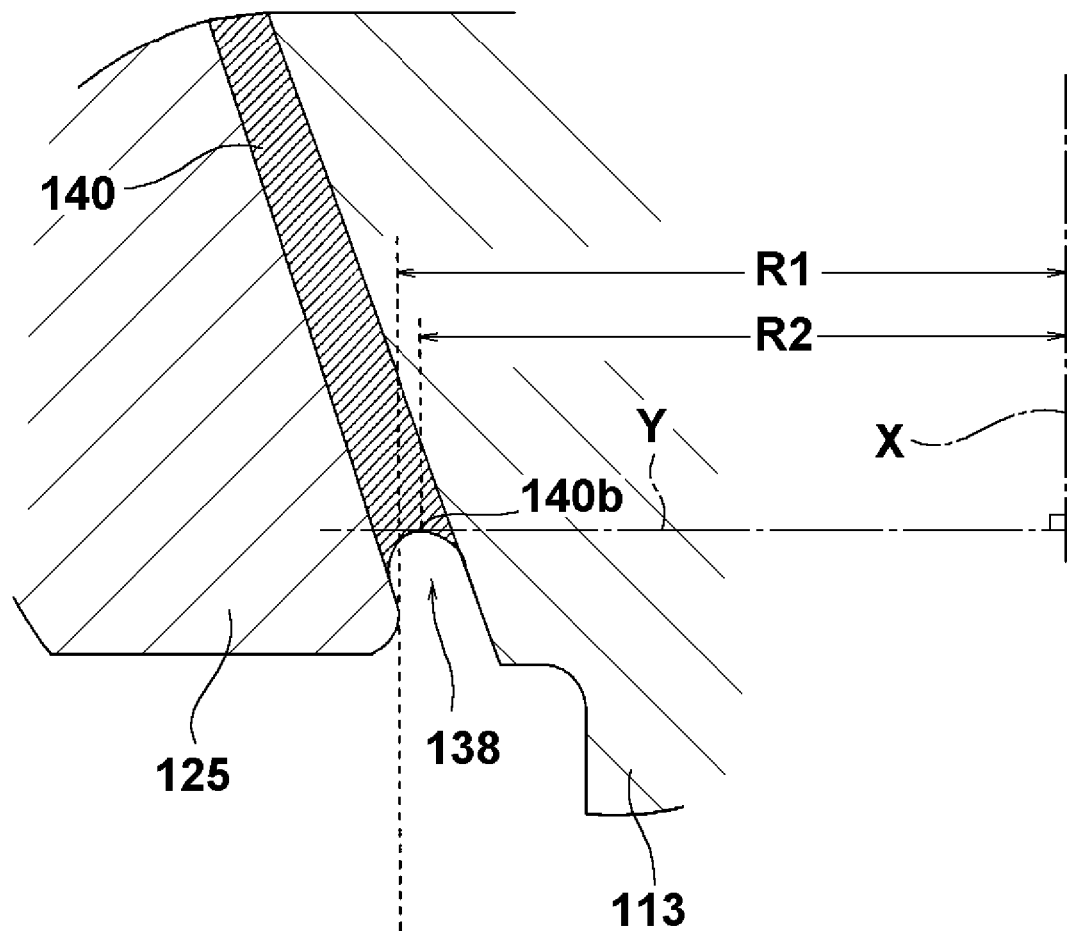
FIG. 4 is an enlarged longitudinal sectional view showing an opening section of a composite capillary seal section according to a second embodiment of the present invention.
Figure 5:
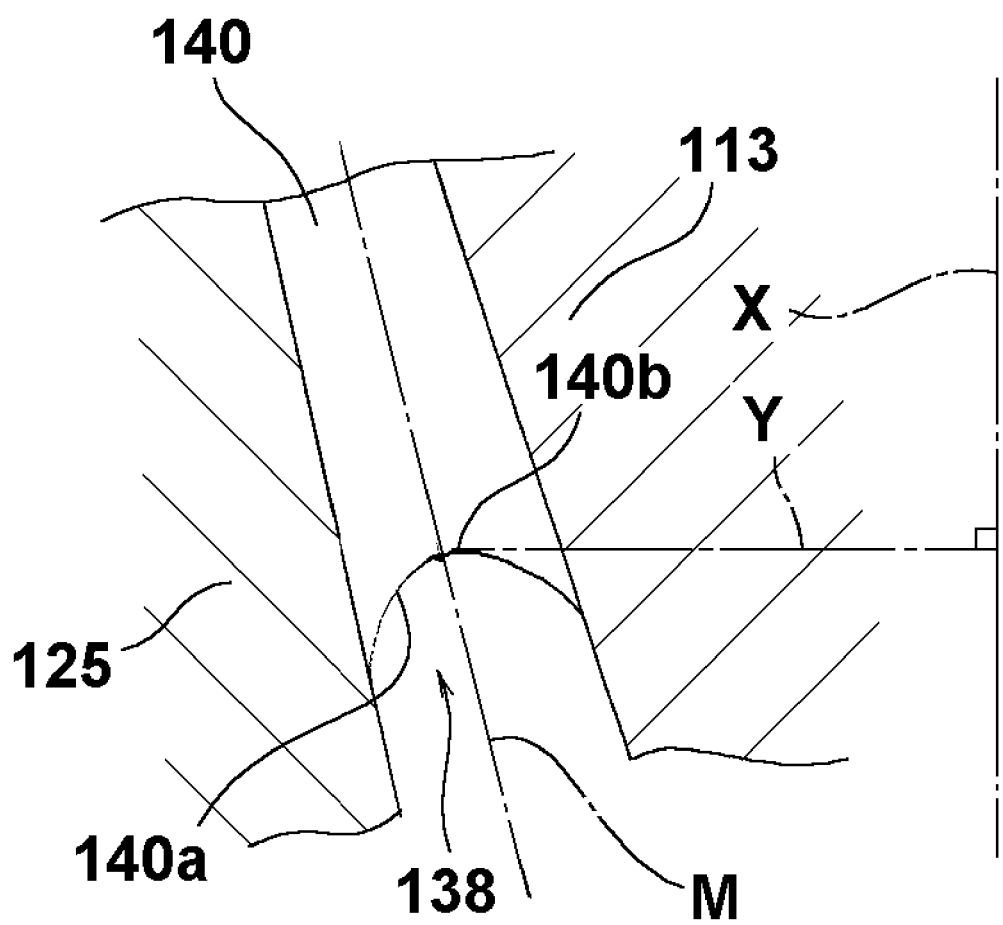
FIG. 5 is a longitudinal sectional view enlarging a vapor-liquid surface of oil retained in the composite capillary seal section shown in FIG. 4.

Subsequently, a second embodiment of the present invention will be explained with reference to FIGS. 4 and 5. The motor of this embodiment has a construction basically same as that in the above-mentioned first embodiment, so that the corresponding members are designated by numerals of one hundred something for clarifying the correspondence. Further, the different points are only explained in the following explanation.

A inner point 140b of a vapor-liquid face 140a in a composite capillary seal section 138 in the second embodiment is different from that of the first embodiment. Specifically, the inner point 140b is set at the position where a radial-direction plane Y that is perpendicular to the rotation axis X comes in contact with the vapor-liquid face 140a of oil 140. The liquid level of the vapor-liquid face 140a of the oil 140 is measured at this inner point 140b.

The liquid level of the vapor-liquid face 140a of the oil 140 obtained by measuring the inner point 140b is adjusted to a preset position in the composite capillary seal section 138, thereby adjusting the filling amount of the oil 140. In this way, the adjustment of the filling amount of the oil 140 can surely be performed in the second embodiment, too.

Subsequently, third and fourth embodiments of the present invention will be explained with reference to FIGS. 6 and 7. The motor of this embodiment has a construction basically same as that in the above-mentioned first embodiment, so that the corresponding members are designated by numerals of two hundred something or three hundred something for clarifying the correspondence. Further, the different points are only explained in the following explanation.

Figure 6:
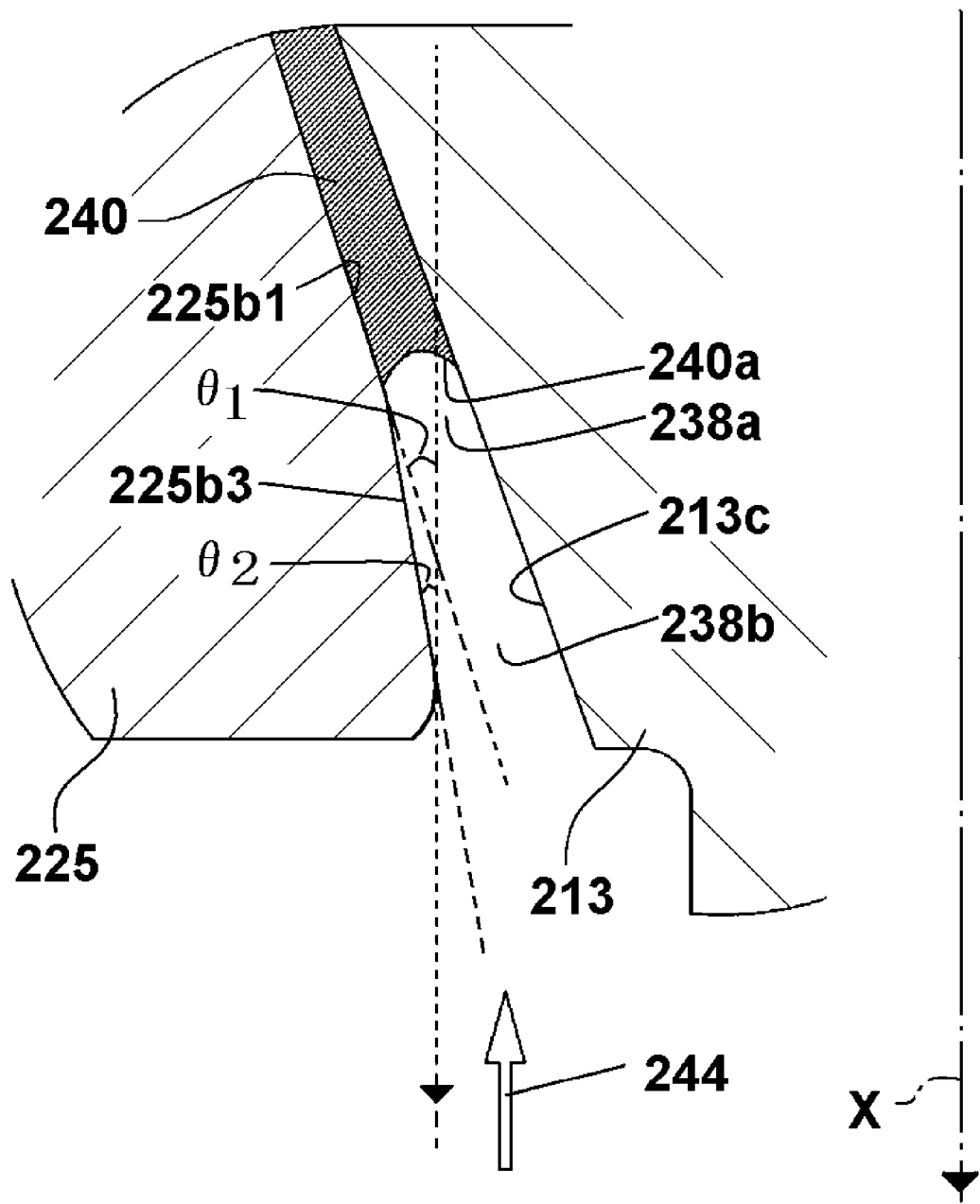
FIG. 6 is an enlarged longitudinal sectional view showing an opening section of a composite capillary seal section according to a third embodiment of the present invention.

As shown in FIG. 6 as the third embodiment, formed at the inner peripheral face of a ring-shaped portion 225 are a first inner peripheral face 225b1 that opposes to an outer peripheral inclined face 213c of a sleeve 213 and extends in the direction of inclination toward the radial-direction inner side with respect to the rotation axis X from the edge section of the thrust dynamic pressure bearing (upper side in FIG. 6) and a second inner peripheral face 225b3 that communicates to the first inner peripheral face 225b1 and extends in the direction of inclination toward the radial-direction inner side with respect to the rotation axis X. A first capillary seal section 238a whose gap size is gradually expanded in the downward in the axial direction from the thrust dynamic pressure bearing is formed in a gap between the outer peripheral inclined face 213c of the sleeve 213 and the first inner peripheral face 225b1. Similarly, a second capillary seal section 238b whose gap size is gradually expanded in the downward direction in the axial direction from the first capillary seal section 238a is formed in a gap between the outer peripheral inclined face 213c of the sleeve 213 and the second inner peripheral face 225b3.

The first inner peripheral face 225b1 that composes the first capillary seal section 238a forms a first angle $\theta_1$ with respect to the rotation axis X, the angle $\theta_1$ taking an angle value of $0<\theta_1\leq90°$. Further, the second inner peripheral face 225b3 that composes the second capillary seal section 238b forms a second angle $\theta_2$ with respect to the rotation axis X, the angle $\theta_2$ taking an angle value of $0\leq\theta_2<90°$. The relationship between the first angle $\theta_1$ and the second angle $\theta_2$ is $\theta_1>\theta_2$.

The oil 240 retained in the thrust dynamic pressure bearing is filled up to the first capillary seal section 238a.

Figure 7:
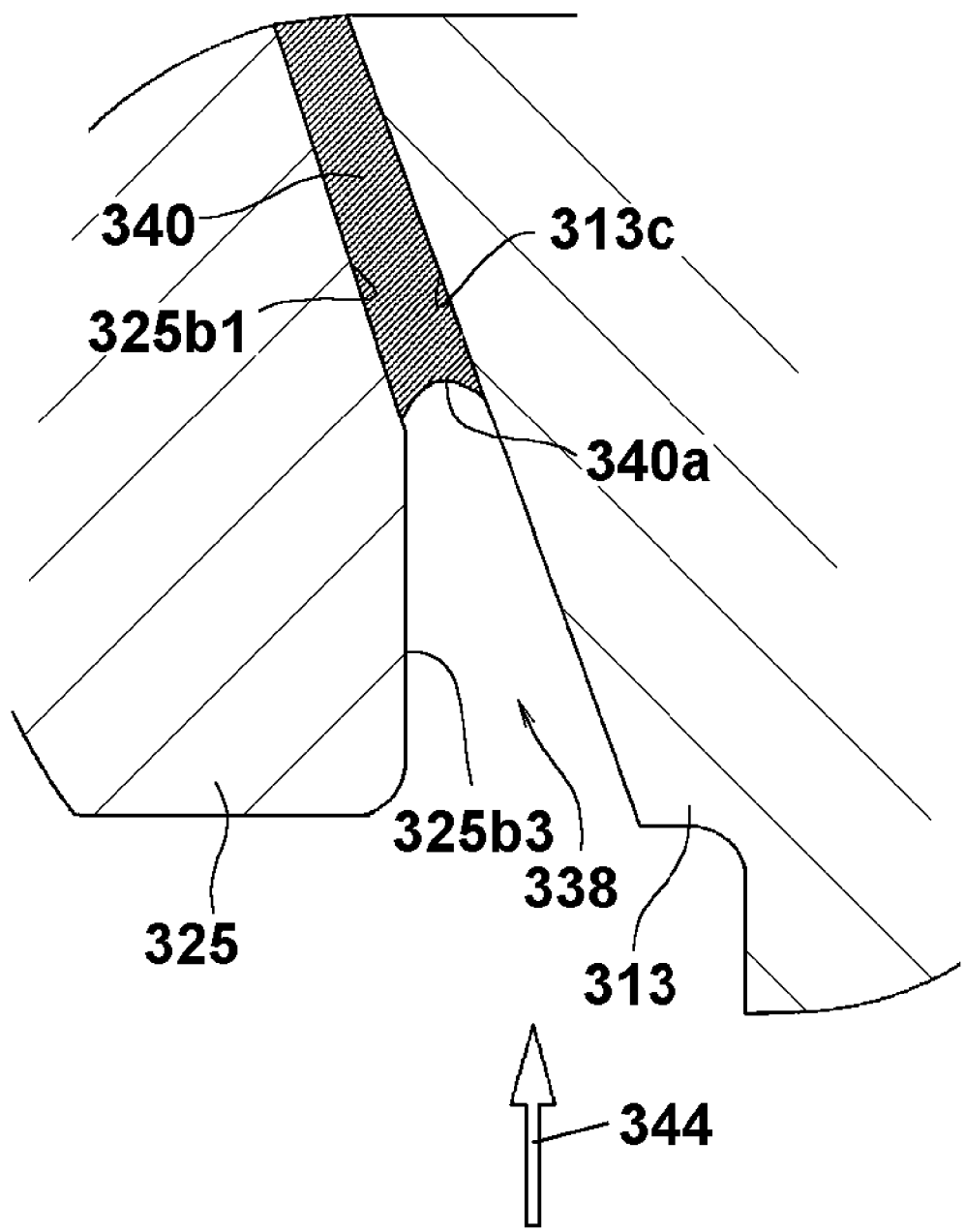
FIG. 7 is an enlarged longitudinal sectional view showing an opening section of a composite capillary seal section according to a fourth embodiment of the present invention.

It should be noted that a second inner peripheral face 325b3 of a ring-shaped portion 325 is formed to be substantially parallel to the rotation axis X in the fourth embodiment shown in FIG. 7.

In the third and fourth embodiments, suitable second inner peripheral faces 225b3 and 325b3 are formed with respect to first inner peripheral faces 225b1 and 325b1 of the ring-shaped portions 225 and 325, thereby being capable of more easily and more surely performing the observation of the vapor-liquid faces 240a and 340a of the oils 240 and 340 retained in the composite capillary seal section 238 and 338, i.e., the measurement of the inner point, from the position immediately above the composite capillary seal sections 238 and 338 as shown by arrows 244 and 344.

Further, the distance from the vapor-liquid faces 240a and 340a of the oils 240 and 340 to the edge section of the thrust dynamic pressure bearing (not shown) at the upper side in FIGS. 6 and 7, i.e., the size of the gap where oils 240 and 340 can be stored in the composite capillary seal sections 238 and 338 can further be increased, thereby being capable of increasing the capacities of the composite capillary seal sections 238 and 338.

Figure 8:
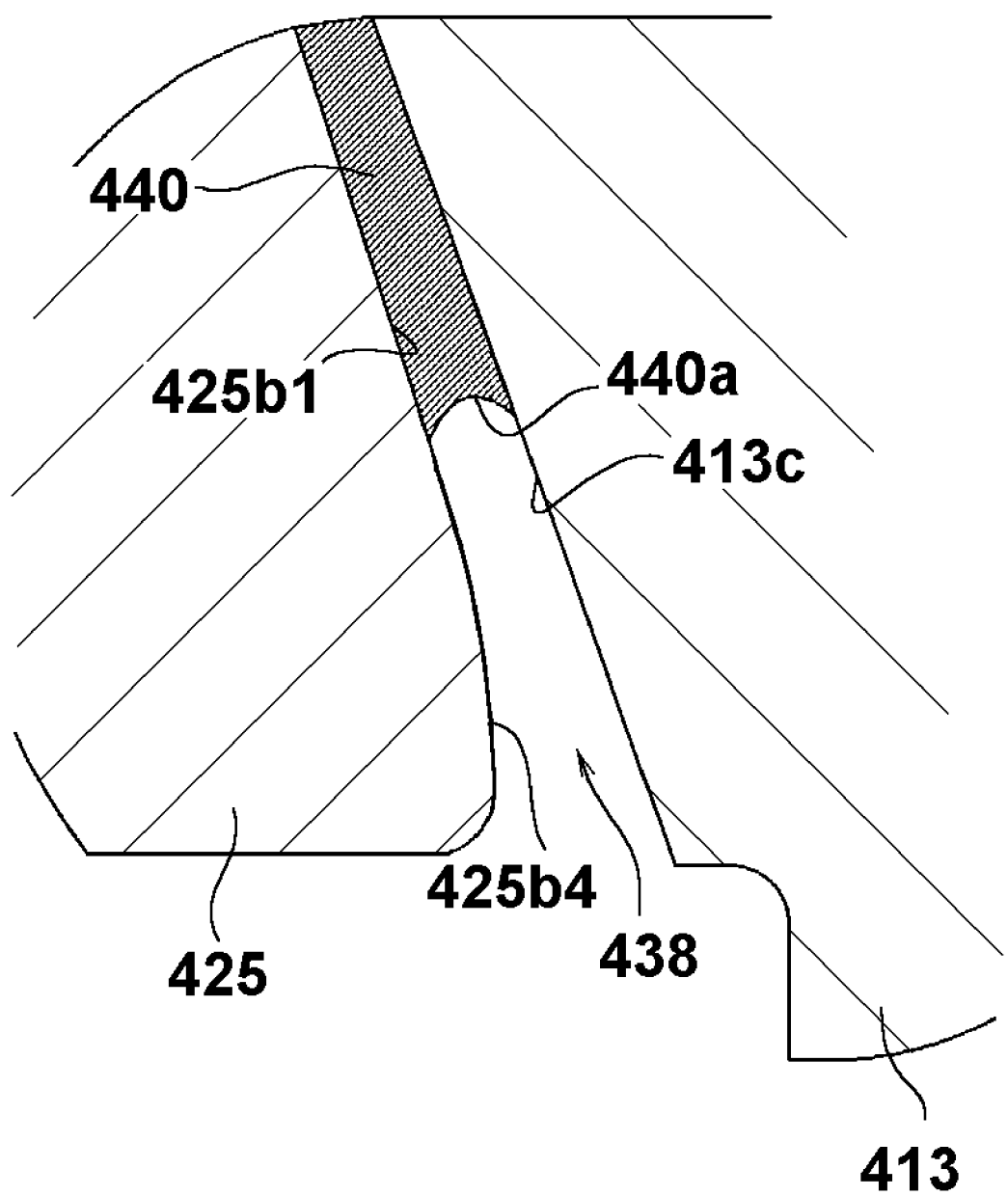
FIG. 8 is an enlarged longitudinal sectional view showing an opening section of a composite capillary seal section according to a fifth embodiment of the present invention.

Subsequently, a fifth embodiment of the present invention will be explained with reference to FIG. 8. The motor of this embodiment has a construction basically same as that in the above-mentioned first embodiment, so that the corresponding members are designated by numerals of four hundred something for clarifying the correspondence. Further, the different points are only explained in the following explanation.

In the fifth embodiment, a second inner peripheral face 425b4 formed by curving a part of a first inner peripheral face 425b1 is formed at the lower side of the first inner peripheral face 425b1 of a ring-shaped portion 425 in the axial direction. The fifth embodiment can achieve the operational effect same as those in the above-mentioned third and fourth embodiments.

Figure 9:
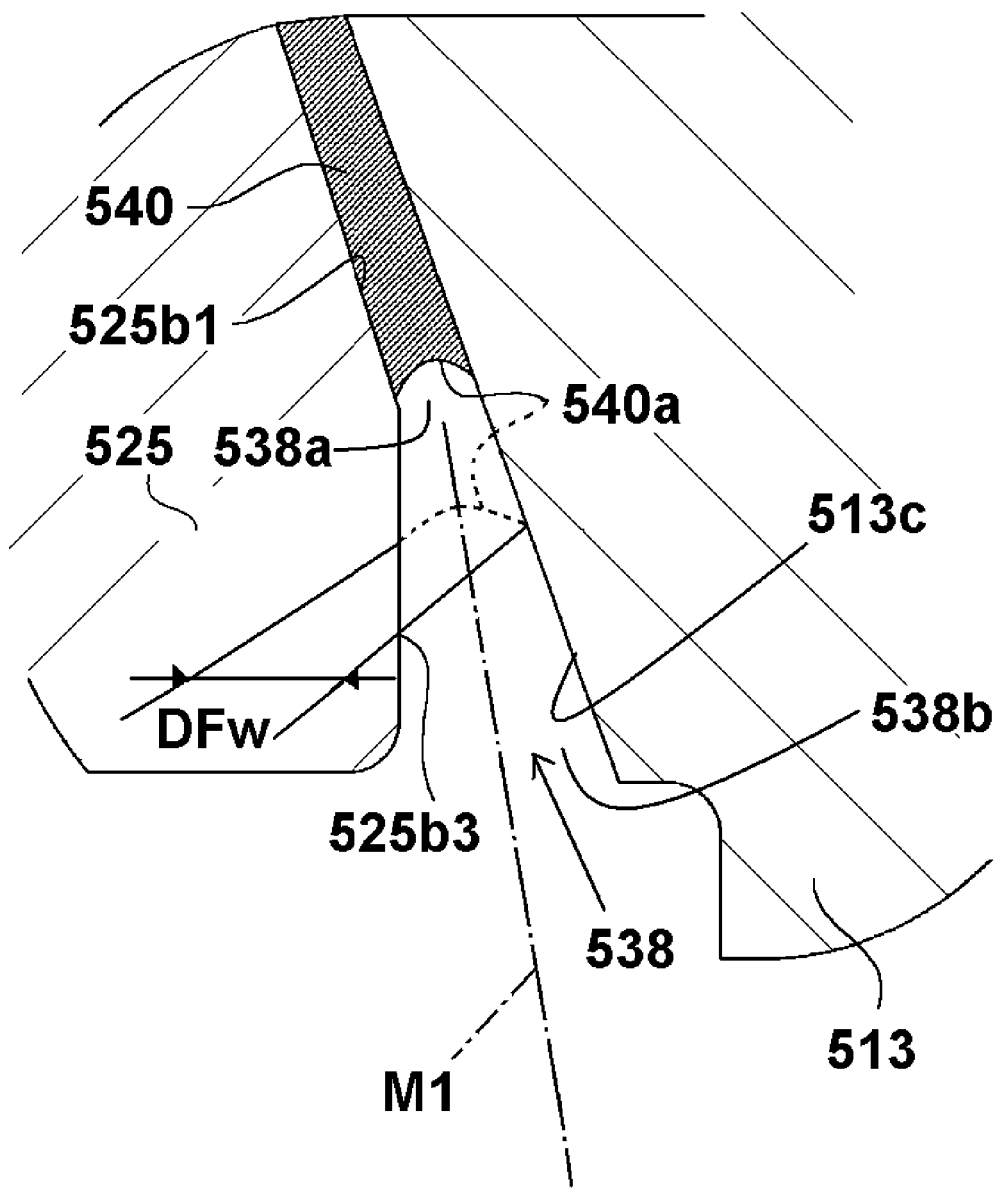
FIG. 9 is an enlarged longitudinal sectional view showing an opening section of a composite capillary seal section according to a sixth embodiment of the present invention.

Subsequently, a sixth embodiment of the present invention will be explained with reference to FIG. 9. The motor of this embodiment has a construction basically same as that in the above-mentioned first embodiment, so that the corresponding members are designated by numerals of five hundred something for clarifying the correspondence. Further, the different points are only explained in the following explanation. Moreover, a composite capillary seal section 538 in the sixth embodiment has a construction basically same as that in the fourth embodiment.

In the sixth embodiment, a vapor-liquid surface 540a of oil 540 is formed at the side of the thrust dynamic pressure bearing (upper side in the figure) upon rotating the motor, while it is formed in a radial-direction gap between an outer peripheral inclined face 513c of a sleeve 513 and a second inner peripheral face 525b3 of a ring-shaped portion 525 when the rotation of the motor is stopped. By this construction, it is possible to measure the position where the vapor-liquid face 540a is formed by observing a width DFw of the vapor-liquid face 540a of the oil 540, thereby being capable of adjusting the filling amount of the oil 540.

Further, the first capillary seal section 538a has a great inclination angle from the outward toward the inward in the radial direction with respect to the rotation axis X, while the second capillary seal section 538b has a slight inclination angle with respect to the rotation axis X. Therefore, the oil 540 retained in the first capillary seal section 538a is pressed toward the thrust dynamic pressure bearing with the centrifugal force when the motor rotates at a high speed, with which the vapor-liquid face 540a formed in the second capillary seal section 538b is also pulled in toward the first capillary seal section 538a, whereby sealing strength is increased.

Moreover, in the sixth embodiment, the center axis line M1 of the second capillary seal section 538b has a slight inclination angle with respect to the rotation axis X. Therefore, when the rotation of the motor is stopped, i.e., even in case, for example, where vibration of the motor occurs in the axial direction due to external force, the width DFw of the vapor-liquid face 540a formed on a broken line hardly changes. Accordingly, the breakdown of the vapor-liquid face 540a caused by the external force and the scattering of the oil 540 to the outside of the hydrodynamic bearing with this breakdown are prevented, and hence, the pollution in or out of the spindle motor is prevented.

Subsequently, a seventh embodiment of the present invention will be explained with reference to FIG. 10. The motor of this embodiment has a construction basically same as that in the above-mentioned first embodiment, so that the corresponding members are designated by numerals of six hundred something for clarifying the correspondence. Further, the different points are only explained in the following explanation.

In the seventh embodiment, a ring-shaped stopper member 660 is fixed to the lower end section of a shaft 621. This stopper member 660 is accommodated in a concave section 613d that opens in the axial direction at the lower end section of the sleeve 613, and faces to the concave section 613d in the axial and radial directions. The stopper member 660 prevents that a rotor assembly 620 is detached from a stationary assembly 610. The seventh embodiment can attain the operational effect same as those in the above-mentioned each embodiment.

Subsequently, an eighth embodiment of the present invention will be explained with reference to FIG. 11. The motor of this embodiment has a construction basically same as that in the above-mentioned first embodiment, so that the corresponding members are designated by numerals of seven hundred something for clarifying the correspondence. Further, the different points are only explained in the following explanation.

In the eighth embodiment, a shaft 721 is fixed to the approximately central section of a base plate 711 that is a part of a stationary assembly 710. The stationary assembly 710 supports a rotor assembly 720 via a hydrodynamic bearing. The hydrodynamic bearing is provided with upper and lower radial dynamic pressure bearings RB1 and RB2 formed in a radial-direction gap between the outer peripheral surface of the shaft 721 and the inner peripheral surface of the sleeve 713 and a thrust dynamic pressure bearing 734 formed in an axial-direction gap between the upper end surface of the base plate 711 and the lower end surface of the sleeve 713. It should be noted that a top plate represents the base plate 711 and a bottom plate represents a rotor hub 722 in this embodiment.

The eighth embodiment can attain the operational effect same as those in the above-mentioned each embodiment.

Subsequently, an internal construction of a popular disk drive device 50 will be explained with reference to FIG. 12. The inside of a housing 51 forms a clean space having extremely less dust, in which a spindle motor 52 having a disc-like disk plate 53 for memorizing information mounted thereto is installed. Additionally, a head moving mechanism 57 that reads and writes information from or to the disk plate 53 is arranged in the housing 51. This head moving mechanism 57 is composed of a head section 56 that reads and writes the information on the disk plate 53, an arm 55 that supports the head section 56 and an actuator section 54 that moves the head 56 and the arm 55 to a required position on the disk plate 53.

Figure 10:
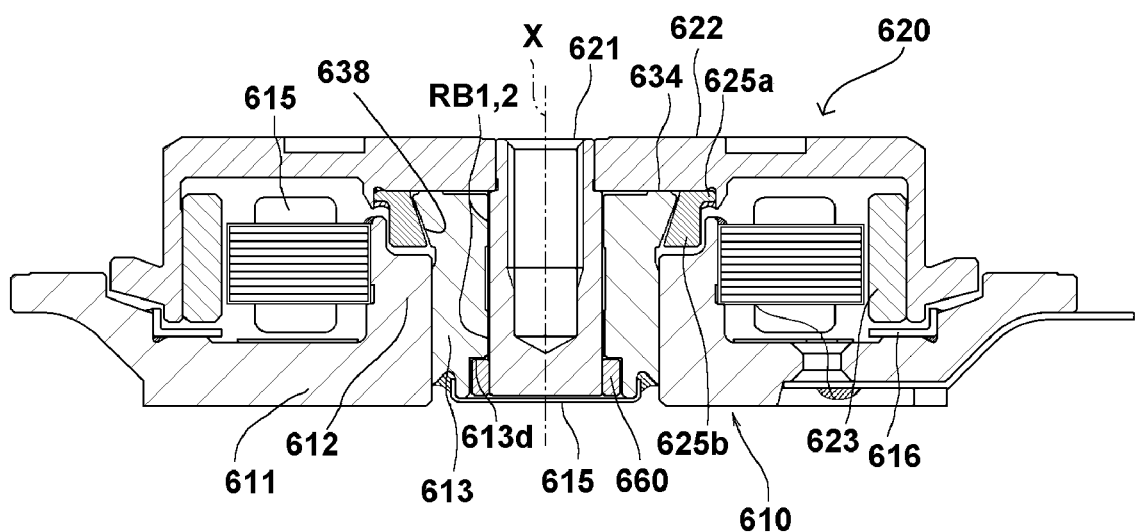
FIG. 10 is a longitudinal sectional view showing a spindle motor according to a seventh embodiment provided with a hydrodynamic bearing of the present invention.
Figure 11:
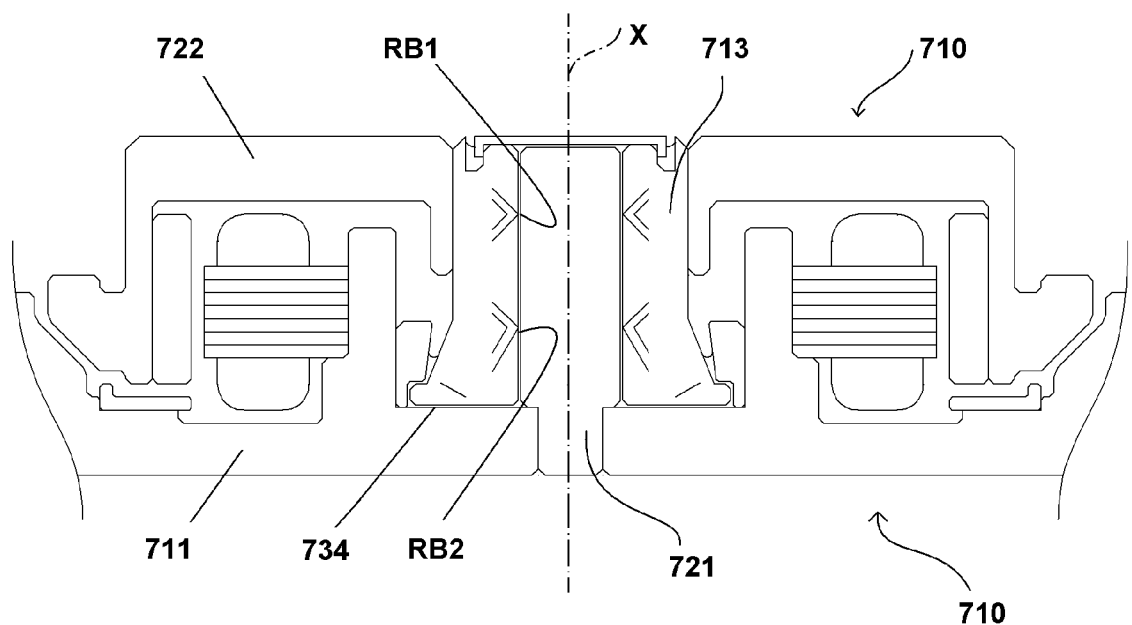
FIG. 11 is a longitudinal sectional view showing a spindle motor according to an eighth embodiment provided with a hydrodynamic bearing of the present invention.

The spindle motors shown in FIGS. 1, 10 and 11 are used as the spindle motor 52 in this disk drive device 50, with the result that a high-speed and high-precise rotational support can be achieved. Therefore, it is possible to cope with high-capacity of the disk plate 53. In addition to this, the pollution in the housing 51 due to the oil scattered from the hydrodynamic bearing of the spindle motor 52 is prevented. Consequently, an error in reading/writing the recording data in the disk plate 53 can be prevented as much as possible, thereby being capable of enhancing reliability and durability.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

For example, the present invention is applied to a spindle motor for a hard disk drive device (HDD) in the abovementioned each embodiment, but the present invention can similarly be applied to many other various types of hydrodynamic bearings.

Moreover, the sleeve in each embodiment can also be formed of oil-impregnated porous sintered body.

Further, the base plate in each embodiment can also be formed integral with the housing of the hard disk drive device.

What is claimed is:

1. A hydrodynamic bearing comprising:
    a shaft;
    a top plate fixed to the upper section of the shaft, the top plate having an ring-shaped portion extended in a lower direction, the ring-shaped portion having an inner peripheral face;
    a sleeve that rotates relative to the shaft about a rotation axis;
    a bottom plate fixed to the lower section of the sleeve;
    a bearing section including a minute gap formed between the upper end face of the sleeve and the lower end face of the top plate, a lubricating fluid retained in the minute gap and dynamic pressure generating grooves formed on at least one of the upper end face of the sleeve and the lower end face of the top plate, that induce dynamic pressure in the lubricating fluid when the shaft or the sleeve rotates relatively; and
    a capillary seal section adjoining the bearing section, having a radial gap between an outer peripheral face of the sleeve and the inner peripheral face of the ring-shaped portion; wherein
    the bearing section supports the shaft and the sleeve so as to rotate relative to the rotation axis,
    the lubricating fluid is continuously retained from the bearing section to the capillary seal section and forms a vapor-liquid interface within the capillary seal section,
    a radial separation of the inner peripheral face of the ring-shaped portion from the rotation axis at least widens the further along the rotation axis the radial separation is from the bearing section, and
    letting the minimum value of radial separation between the inner peripheral face of the ring-shaped portion and the rotation axis be R1, and the radial separation from the point in the vapor-liquid interface that is uppermost, in the direction toward the top plate and paralleling the rotation axis, be R2, then the minimum value R1 and the radial-separation R2 fulfill the relation R1>R2.

2. A hydrodynamic bearing according to claim 1, wherein, a center axis line of the radial gap composing the capillary seal section is defined as M and a radial-direction plane that is perpendicular to the rotation axis is defined as Y, and the inner point on the boundary between the vapor-liquid face of the lubricating fluid and the outer peripheral face of the sleeve is a position where the center axis line M and the radial-direction plane Y crosses each other.

3. A hydrodynamic bearing according to claim 1 wherein the capillary seal section comprising:
    a first capillary seal section adjoining the bearing section, having a first radial gap between the outer peripheral face of the sleeve and a first inner peripheral face of the ring-shaped portion, the first radial gap at least widening the further along the rotation axis the radial dimension of the first radial gap is from the bearing section, and
    a second capillary seal section adjoining the first capillary seal section, having a second radial gap between the outer peripheral face of the sleeve and a second inner peripheral face of the ring-shaped portion, the second radial gap at least widening the further along the rotation axis the radial dimension of the second radial gap is from the bearing section;
    wherein a first radial separation of the first inner peripheral face of the ring-shaped portion from the rotation axis at least shortens the further along the rotation axis the first radial separation is from said bearing section, and the first inner peripheral face forms a first angle $\theta_1$, whose value is in the range $0<\theta_1 \leq 90°$, with respect to the rotation axis, a second radial separation of the second inner peripheral face of the ring-shaped portion from the rotation axis at least shortens the further along the rotation axis the second radial separation is from said bearing section, and the second inner peripheral face forms a second angle $\theta_2$, whose value is in the range $0 \leq \theta_2 < 90°$, with respect to the rotation axis,
    the first angle $\theta_1$ and the second angle $\theta_2$ takes a relationship of $\theta_1 > \theta_2$.

4. A hydrodynamic bearing according to claim 3, wherein the second angle $\theta_2$ is $\theta_2 > 0$.

5. A manufacturing method of the hydrodynamic bearing according to claim 1 comprising:
    a step of measuring a filling amount of the lubricating fluid by observing the inner point of the lubricating fluid from a position immediately above the inner point in a direction approximately parallel to the rotation axis; and
    a step of adjusting the filling amount of the lubricating fluid.

6. A manufacturing method of the hydrodynamic bearing according to claim 5, wherein
    a step of setting the inner point on the boundary between the vapor-liquid face of the lubricating fluid and outer peripheral face of the sleeve for measuring the radial-direction distance R2 from the inner point to the rotation axis; and
    a step of adjusting the filling amount of the lubricating fluid by adjusting the inner point on the boundary obtained by the measuring step to a preset position.

7. A manufacturing method of the hydrodynamic bearing according to claim 6, comprising:
    a step of, when the center axis line of the radial gap composing the capillary seal section is defined as M and a radial-direction plane perpendicular to the rotation axis is defined as Y, setting the inner point to a position where the rotation axis M and the radial-direction plane Y cross each other, thereby measuring the inner point; and
    a step of adjusting the vapor-liquid face of the lubricating fluid in the inner point obtained by the measuring step to a preset position, thereby adjusting the filling amount of the lubricating fluid.

8. A spindle motor comprising:
    a shaft;
    a top plate fixed to the upper section of the shaft, the top plate having an ring-shaped portion extended in a lower direction, the ring-shaped portion having an inner peripheral face;
    a sleeve that rotates relative to the shaft about a rotation axis;
    a bottom plate fixed to the lower section of the sleeve;
    a bearing section including a minute gap formed between the upper end face of the sleeve and the lower end face of the top plate, a lubricating fluid retained in the minute gap and dynamic pressure generating grooves formed on at least one of the upper end face of the sleeve and the lower end face of the top plate, that induce dynamic pressure in the lubricating fluid when the shaft or the sleeve rotates relatively;

a capillary seal section adjoining the bearing section, having a radial gap between an outer peripheral face of the sleeve and the inner peripheral face of the ring-shaped portion;

a stator supported by the bottom plate; and a magnet supported by the top plate for producing rotational magnetic field with the stator; wherein the bearing section supports the shaft and the sleeve so as to rotate relative to the rotation axis, the lubricating fluid is continuously retained from the bearing section to the capillary seal section and forms a vapor-liquid interface within the capillary seal section, a radial separation of the inner peripheral face of the ring-shaped portion from the rotation axis at least widens the further along the rotation axis the radial separation is from the bearing section, and letting the minimum value of radial separation between the inner peripheral face of the ring-shaped portion and the rotation axis be R1, and the radial separation from the point in the vapor-liquid interface that is uppermost, in the direction toward the top plate and paralleling the rotation axis, be R2, then the minimum value R1 and the radial-separation R2 fulfill the relation R1>R2.

9. A spindle motor according to claim 8, wherein, a center axis line of the radial gap composing the capillary seal section is defined as M and a radial-direction plane that is perpendicular to the rotation axis is defined as Y, and the inner point on the boundary between the vapor-liquid face of the lubricating fluid and the outer peripheral face of the sleeve is a position where the center axis line M and the radial-direction plane Y crosses each other.

10. A spindle motor to claim 8, wherein the capillary seal section comprising:

a first capillary seal section adjoining the bearing section, having a first radial gap between the outer peripheral face of the sleeve and a first inner peripheral face of the ring-shaped portion, the first radial gap at least widening the further along the rotation axis the radial dimension of the first radial gap is from the bearing section, and a second capillary seal section adjoining the first capillary seal section, having a second radial gap between the outer peripheral face of the sleeve and a second inner peripheral face of the ring-shaped portion, the second radial gap at least widening the further along the rotation axis the radial dimension of the second radial gap is from the bearing section;

wherein a first radial separation of the first inner peripheral face of the ring-shaped portion from the rotation axis at least shortens the further along the rotation axis the first radial separation is from said bearing section, and the first inner peripheral face forms a first angle $\theta_1$, whose value is in the range $0<\theta_1 \leq 90°$, with respect to the rotation axis, and a second radial separation of the second inner peripheral face of the ring-shaped portion from the rotation axis at least shortens the further along the rotation axis the second radial separation is from said bearing section, and the second inner peripheral face forms a second angle $\theta_2$, whose value is in the range $0 \leq \theta_2 < 90°$, with respect to the rotation axis, the first angle $\theta_1$ and the second angle $\theta_2$ takes a relationship of $\theta_1 > \theta_2$.

11. A spindle motor according to claim 10, wherein the second angle $\theta_2$ is $\theta_2 > 0$.

12. A manufacturing method of the spindle motor according to claim 8 comprising:

a step of measuring a filling amount of the lubricating fluid by observing the inner point from a position immediately above the inner point in a direction approximately parallel to the rotation axis; and a step of adjusting the filling amount of the lubricating fluid.

13. A manufacturing method of the spindle motor according to claim 12, wherein a step of setting the inner point on the boundary between the vapor-liquid face of the lubricating fluid and outer peripheral face of the sleeve for measuring the radial-direction distance R2 from the inner point to the rotation axis; and a step of adjusting the filling amount of the lubricating fluid by adjusting the inner point on the boundary obtained by the measuring step to a preset position.

14. A manufacturing method of the spindle motor according to claim 12, comprising:

a step of, when the center axis line of the radial gap composing the capillary seal section is defined as M and a radial-direction plane perpendicular to the rotation axis is defined as Y, setting the inner point to a position where the rotation axis M and the radial-direction plane Y cross each other, thereby measuring the inner point; and a step of adjusting the vapor-liquid face of the lubricating fluid in the inner point obtained by the measuring step to a preset position, thereby adjusting the filling amount of the lubricating fluid.

15. A disk drive device to which a disc-like recording medium, that can record information, is mounted, comprising:

a housing;

a spindle motor fixed in the housing for rotating the recording medium; and means for writing or reading information to or from a required position on the recording medium; wherein the spindle motor comprising:

a shaft;

a top plate fixed to the upper section of the shaft, the top plate having an ring-shaped portion extended in a lower direction, the ring-shaped portion having an inner peripheral face;

a sleeve that rotates relative to the shaft about a rotation axis;

a bottom plate fixed to the lower section of the sleeve;

a bearing section including a minute gap formed between the upper end face of the sleeve and the lower end face of the top plate, a lubricating fluid retained in the minute gap and dynamic pressure generating grooves formed on at least one of the upper end face of the sleeve and the lower end face of the top plate, that induce dynamic pressure in the lubricating fluid when the shaft or the sleeve rotates relatively; and a capillary seal section adjoining the bearing section, having a radial gap between an outer peripheral face of the sleeve and the inner peripheral face of the ring-shaped portion;

a stator supported by the bottom plate; and a magnet supported by the top plate for producing rotational magnetic field with the stator; wherein the bearing section supports the shaft and the sleeve so as to rotate relative to the rotation axis, the lubricating fluid is continuously retained from the bearing section to the capillary seal section and forms a vapor-liquid interface within the capillary seal section, a radial separation of the inner peripheral face of the ring-shaped portion from the rotation axis at least widens the further along the rotation axis the radial separation is from the bearing section, and letting the minimum value of radial separation between the inner peripheral face of the ring-shaped portion and the rotation axis be R1, and the radial separation from the point in the vapor-liquid interface that is uppermost, in the direction toward the top plate and paralleling the rotation axis, be R2, then the minimum value R1 and the radial-separation R2 fulfill the relation R1>R2.

* * * * *